(12) United States Patent
Andochick

(10) Patent No.: US 8,398,155 B2
(45) Date of Patent: Mar. 19, 2013

(54) VEHICLE CABIN INTERIOR SURFACE WITH EMBEDDED MAGNETIC HOLDER

(76) Inventor: Scott E. Andochick, Potomac, MD (US)

( * ) Notice: Subject to any disclaimer, the term of this patent is extended or adjusted under 35 U.S.C. 154(b) by 535 days.

(21) Appl. No.: 12/416,571

(22) Filed: Apr. 1, 2009

(65) Prior Publication Data

US 2010/0253452 A1 Oct. 7, 2010

(51) Int. Cl.
*B60R 13/04* (2006.01)

(52) U.S. Cl. .......... 296/191; 296/37.12; 296/37.13; 296/37.15; 296/37.16; 296/70; 248/683; 224/483; 224/562; 224/585; 335/285

(58) Field of Classification Search ......... 248/309.4, 248/683; 224/483, 562, 585; 296/1.07–1.09, 296/37.1–37.16, 70–74, 191; 335/285
See application file for complete search history.

(56) References Cited

U.S. PATENT DOCUMENTS

| | | | |
|---|---|---|---|
| 2,912,213 A | 11/1959 | Krystosek | |
| 2,964,275 A | 12/1960 | Atkinson | |
| 2,988,410 A | 6/1961 | Weisz | |
| 3,329,277 A | 7/1967 | Gaudino | |
| 3,756,252 A * | 9/1973 | Vigorito | 131/256 |
| 4,303,109 A | 12/1981 | Cohen | |
| 5,040,841 A | 8/1991 | Yang | |
| 5,181,555 A | 1/1993 | Chruniak | |
| 5,246,190 A | 9/1993 | Swirkal | |
| 5,860,573 A | 1/1999 | Hossack et al. | |
| 5,979,724 A | 11/1999 | Loewenthal, Jr. et al. | |
| 5,992,807 A | 11/1999 | Tarulli | |
| 6,098,860 A | 8/2000 | Phillips | |
| 6,149,116 A | 11/2000 | Won | |
| 6,305,656 B1 | 10/2001 | Wemyss | |
| 7,897,088 B2 * | 3/2011 | Mitchell | 264/275 |
| 2005/0045684 A1 | 3/2005 | Ouyang | |
| 2007/0119885 A1 * | 5/2007 | Miller et al. | 224/275 |
| 2008/0099521 A1 | 5/2008 | Huang et al. | |

FOREIGN PATENT DOCUMENTS

WO WO 2005056340 A1 * 6/2005

* cited by examiner

Primary Examiner — Ramon Barrera

(57) ABSTRACT

A magnetic holding system for a vehicle cabin includes a non-ferrous panel having a front side exposed to the vehicle cabin and a rear side. A magnet is located on the rear side of the non-ferrous panel. The thickness panel, in the region where the magnet is located, and the strength of the magnet are selected to grip a ferrous element when it is placed on the front side of the panel in the region where the magnet is located. The ferrous element may be an object to be held on the non-ferrous surface or it may be attachable to the underside of an object that is to be held.

30 Claims, 3 Drawing Sheets

VEHICLE CABIN INTERIOR SURFACE WITH EMBEDDED MAGNETIC HOLDER

BACKGROUND

A variety of devices for holding objects on the dashboard of an automobile are known in the art.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
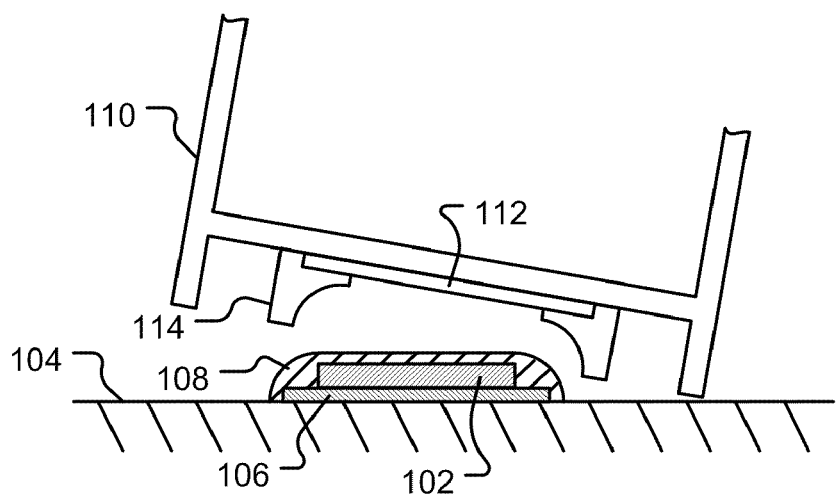
FIG. 1 is an exemplary magnetic holder of the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an embedded magnetic holder. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is an exemplary magnetic holder of the prior art. Referring to FIG. 1, a magnet 102 is attached to a non-ferrous surface 104. The magnetic 104 is backed by a ferrous disk 106 to increase the strength of the magnetic field of the magnet 102. The magnet 102 and ferrous disk 106 are encased in a soft, non-ferrous shell 108. An object 110 is held in place by a combination of (1) the magnetic attraction between a ferrous disk 112, and the magnet 102, and (2) the conforming shapes of the ferrous shell 108 and a support collar 114. The support collar 114 is attached to the object 110 and holds the ferrous disk 112.

One disadvantage of this approach is that any object to be attached using the magnetic is required to have a conforming collar 112. A further disadvantage is that the magnet is fixed on top of the surface and so creates visible protrudes, which may spoil the aesthetic appeal of the surface.

The present invention relates to a magnetic holding system for a vehicle cabin. In some embodiments, the system includes a non-ferrous panel having a front side, exposed to the vehicle cabin, and a rear side. A magnet is located on the rear side of the non-ferrous panel. The thickness of the non-ferrous panel, in the region where the magnet is located, and the strength of the magnet are selected to enable a ferrous element to be held when it is placed on the front side of the panel in the region where the magnet is located. The ferrous element may be an object to be held on the non-ferrous surface or it may be attachable to the underside of an object that is to be held.

Figure 2:
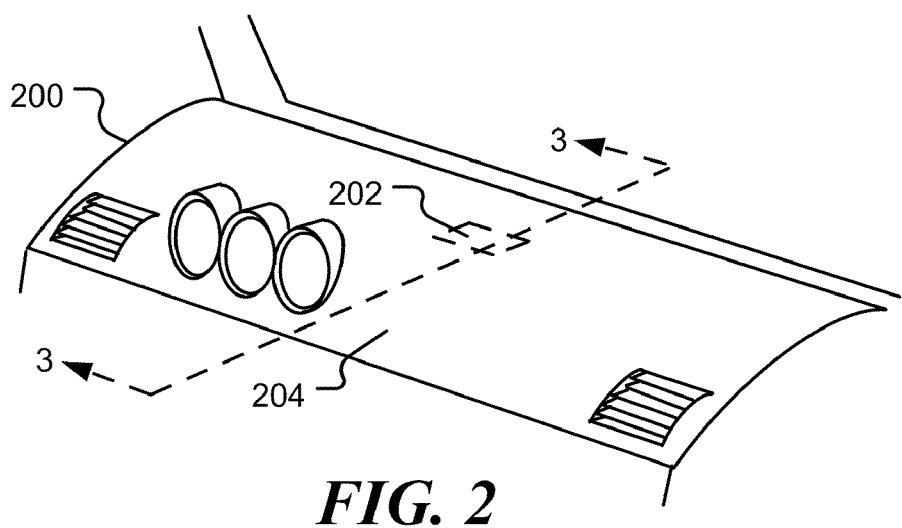
FIG. 2 is a diagrammatic representation of an interior surface of vehicle cabin with an embedded magnetic holder in accordance with some embodiments of the invention.

FIG. 2 is a diagrammatic representation of an automobile dashboard 200 with an embedded magnetic holder in accordance with some embodiments of the invention. In contrast to prior magnetic holders, a magnet 202 is embedded in, or attached behind, a non-ferrous surface 204. The contour of non-ferrous surface 204, which may be substantially flat or slightly curved, is not distorted by the magnet 202, so the aesthetic appeal of the surface is not degraded by the presence of the magnet 202. In accordance with the present invention, the magnet may be installed behind other interior surfaces of an automobile cabin, such as the surface of a center console, glove box or seat back. The rear of the magnet may be covered with a covering 206. The covering 206 may constructed of a non-ferrous material and used to hold the magnet in place, or it may be constructed of a ferrous material and used to increase the strength of the magnetic field. Additionally, the covering may be adapted to stiffen the non-ferrous panel in the region where the magnet is located. An exemplary cross-section 3-3 is shown in FIG. 3.

Ceramic (strontium ferrite), alnico (aluminum, nickel, and cobalt) or rare earth (samarium cobalt and neodymium) magnets be used.

In one embodiment a high energy flexible magnet is used, such as magnet composed of a strontium ferrite powder mixture with polymer bonding.

Figure 3:
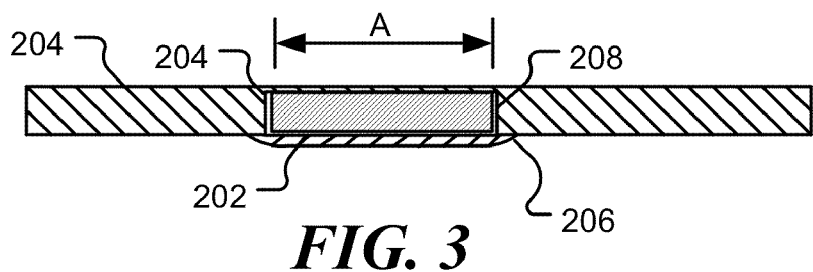
FIG. 3 is a cross-sectional view of a magnetic holder embedded in an interior surface of an automobile cabin in accordance with some embodiments of the present invention.

FIG. 3 is a cross-sectional view of a magnetic holder embedded in an interior surface of an automobile cabin in accordance with some embodiments of the present invention. In this embodiment, the magnet 202 is embedded in the surface 204 and held in place by covering 206. The magnet is held within cavity 208 formed in the surface. This cavity serves firstly to hold the magnet in position and secondly to reduce the thickness of the surface 204 in the region marked as 'A'. This thickness is an important design consideration because, for a given magnet, the strength of the magnetic field above the magnet is reduced for thicker material covering the magnet. The non-ferrous panel may be substantially flat in and around the region where the magnet is located.

The cavity may be sized to allow thermal expansion of the magnet, if the magnet and the non-ferrous material may have different coefficients of thermal expansion.

In one embodiment, the magnet is an industrial strength magnet with approximate dimensions: 1.875"×0.875"×0.375" (length×width×thickness).

In one embodiment, the thickness of the material is 3 mm or less.

In a further embodiment, the thickness of the material is 1 mm or less.

Figure 4:
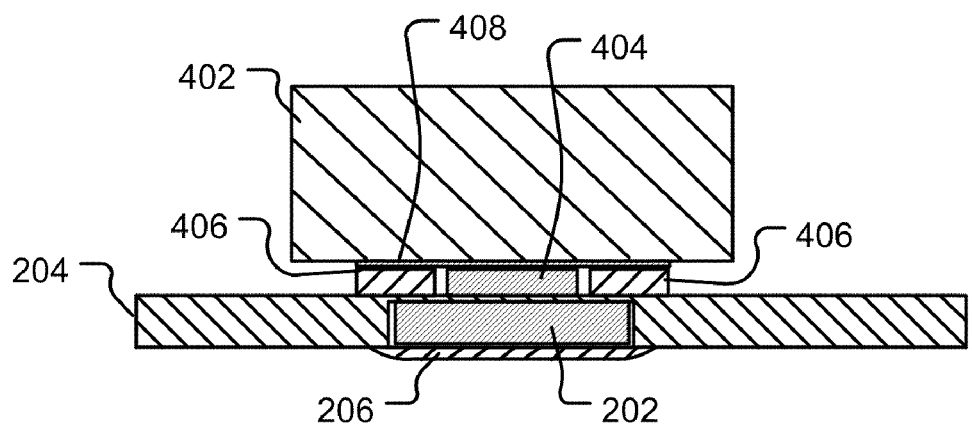
FIG. 4 is a cross-sectional view of an embedded magnetic holder and an object held by magnetic attraction in accordance with some embodiments of the present invention.

FIG. 4 is a cross-sectional view of a magnetic holding system in accordance with some embodiments of the present invention. The system includes an embedded magnetic holder that enables an object to be held by magnetic attraction. The object 402 may any object that a user wishes to be held on the surface. Examples include cups, plates, bowls, mobile telephones, GPS devices, personal digital assistants (PDA's), sunglass cases, tissue dispensers, picture frames, etc.

Ferrous objects may be held directly by the magnet when placed on the surface in the region of the magnet. If the object 402 is non-ferrous, a ferrous element 404 may be attached to the object. The ferrous element may be a ferrous disk, for example. In one embodiment, the ferrous element 404 is a magnet, oriented such that it is attracted to the magnet 202. This increases the magnetic holding force, which allows heavier object to the held or allows weaker magnets to be used.

The ferrous element 404 may be smaller in size than the magnet 202, and may be attached to the object 402 by adhesive.

In one embodiment, a compliant, high friction material 406, such as natural rubber or silicone rubber, is attached to the object 402 adjacent to the ferrous element 404. The compliant, high friction material 406 and the ferrous element 404 may be supplied fixed to a common holder 408. The compliant material 406 protrudes downward from the object 402 slightly farther than the ferrous element 404. When the object 402 is placed on the surface 204, the compliant material 406 is slightly compressed. Contact between the compliant material 406 and the surface 204 resists sliding of the object on the surface.

Figure 5:
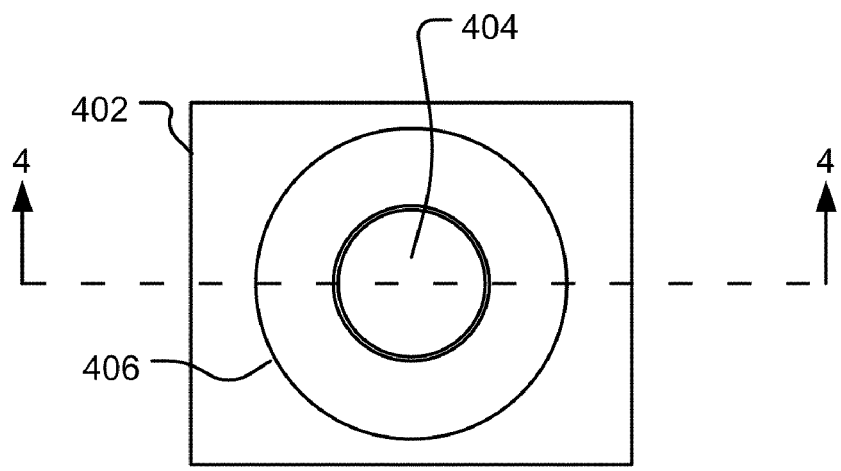
FIG. 5 is a view of the underside of an object adapted for use with an embedded magnetic of the present invention.

FIG. 5 is a view of the underside of the object 402 showing an exemplary arrangement of the ferrous element 404 and the compliant material 406. Other geometries and arrangements will be apparent to those of ordinary skill in the art. For example, the ferrous element 404 may surround the compliant material 406.

Figure 6:
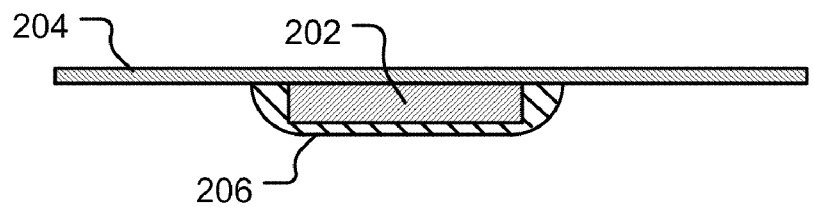
FIGS. 6 and 7 are further cross-sectional views of embedded magnetic holders in accordance with some embodiments of the present invention.
Figure 7:
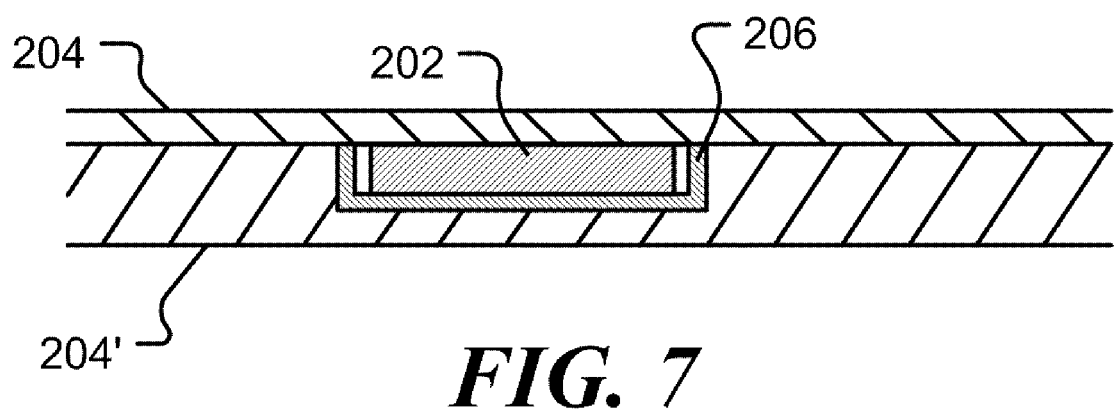

FIGS. 6 and 7 are further cross-sectional views of embedded magnetic holders in accordance with some embodiments of the present invention. In FIG. 6, the surface 204 is sufficiently thin that no cavity is required. The magnet 202 is held in place by the covering 206.

In FIG. 7, the surface 204 comprises two layers, 204 and 204'. The outer layer 204 is sufficiently thin that no cavity is required. The backing layer 204' is used to strengthen the outer layer 204. The magnet 202 is located in a cavity within the backing layer 204'. The outer layer 204 may be a decorative layer such as a vinyl or leather layer.

In the embodiment shown in FIG. 7, the magnet 202 is also backed by a ferrous cover 206. In one embodiment the magnet 202 and the cover 206 may form a cup magnet.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An interior surface of a vehicle cabin comprising:
a non-ferrous panel having a front side exposed to the vehicle cabin and a rear side;
a magnet located on the rear side of the non-ferrous panel; and
a covering element contacting and attached to the rear side of the non-ferrous panel and covering the magnet,
wherein the strength of the magnet is sufficient to grip a ferrous object placed on the front side of the panel in the region where the magnet is located and
wherein the magnet is located in a cavity in the rear of the non-ferrous panel, the cavity sized to allow thermal expansion of the magnet.

2. An interior surface of a vehicle cabin in accordance with claim 1, wherein the magnet is embedded in the non-ferrous panel.

3. An interior surface of a vehicle cabin in accordance with claim 1, wherein the covering element is adapted to stiffen the non-ferrous panel in the region where the magnet is located.

4. An interior surface of a vehicle cabin in accordance with claim 1, wherein the non-ferrous panel is substantially flat in and around the region where the magnet is located.

5. An interior surface of a vehicle cabin in accordance with claim 1, wherein the non-ferrous panel is included in one of the following: a dashboard, a seat back, a glove compartment and a center console.

6. An interior surface of a vehicle cabin in accordance with claim 1, wherein the thickness of the non-ferrous panel is less than approximately 3 mm in the region where the magnet is located.

7. An interior surface of a vehicle cabin comprising:
a non-ferrous panel having a front side exposed to the vehicle cabin and a rear side;
a magnet located on the rear side of the non-ferrous panel;
a covering element contacting and attached to the rear side of the non-ferrous panel and covering the magnet, wherein the strength of the magnet is sufficient to grip a ferrous object placed on the front side of the panel in the region where the magnet is located; and
a ferrous covering element attached to the rear of the magnet.

8. An interior surface of a vehicle cabin in accordance with claim 7, wherein the magnet is embedded in the non-ferrous panel.

9. An interior surface of a vehicle cabin in accordance with claim 7, wherein the covering element is adapted to stiffen the non-ferrous panel in the region where the magnet is located.

10. An interior surface of a vehicle cabin in accordance with claim 7, wherein the non-ferrous panel is substantially flat in and around the region where the magnet is located.

11. An interior surface of a vehicle cabin in accordance with claim 7, wherein the non-ferrous panel is included in one of the following: a dashboard, a seat back, a glove compartment and a center console.

12. An interior surface of a vehicle cabin in accordance with claim 7, wherein the thickness of the non-ferrous panel is less than approximately 3 mm in the region where the magnet is located.

13. A magnetic holding system for a vehicle cabin, comprising:
   a non-ferrous panel having a front side exposed to the vehicle cabin and a rear side;
   a magnet located on the rear side of the non-ferrous panel;
   a ferrous element attachable to the underside of an object that is to be held on the non-ferrous surface,
   a compliant, high friction element adjacent to the ferrous element, the compliant, high friction element extending slightly farther than the ferrous element from the object, such that the compliant high friction element is slightly compressed when the object is placed on the front side of the panel in the region where the magnet is located,
   wherein the strength of the magnet is sufficient to grip the ferrous object when it is placed on the front side of the panel in the region where the magnet is located.

14. A magnetic holding system in accordance with claim 13, wherein the ferrous element comprises a magnet.

15. A magnetic holding system in accordance with claim 13, wherein the non-ferrous panel is included in one of the following: a dashboard, a seat back, a glove compartment and a center console.

16. A magnetic holding system in accordance with claim 13, wherein the magnet has a larger area than the ferrous element.

17. A magnetic holding system for a vehicle cabin in accordance with claim 13,
   a covering element attached to the rear side of the non-ferrous panel and covering the magnet wherein the covering element is adapted to stiffen the non-ferrous panel in the region where the magnet is located.

18. A magnetic holding system in accordance with claim 13, wherein the thickness of the non-ferrous panel is less than approximately 3 mm in the region where the magnet is located.

19. A magnetic holding system for a vehicle cabin, comprising:
   a non-ferrous panel having a front side exposed to the vehicle cabin and a rear side:
   a magnet located on the rear side of the non-ferrous panel;
   a ferrous element attachable to the underside of an object that is to be held on the non-ferrous surface; and
   a covering element contacting and attached to the rear side of the non-ferrous panel and covering the magnet,
   wherein the strength of the magnet is sufficient to grip the ferrous object when it is placed on the front side of the panel in the region where the magnet is located and
   wherein the magnet is located in a cavity in the rear of the non-ferrous panel, and wherein the cavity is sized to allow thermal expansion of the magnet.

20. A magnetic holding system in accordance with claim 19, wherein the ferrous element comprises a magnet.

21. A magnetic holding system in accordance with claim 19, wherein the non-ferrous panel is included in one of the following: a dashboard, a seat back, a glove compartment and a center console.

22. A magnetic holding system in accordance with claim 19, wherein the magnet has a larger area than the ferrous element.

23. A magnetic holding system in accordance with claim 19, wherein the covering element is adapted to stiffen the non-ferrous panel in the region where the magnet is located.

24. A magnetic holding system in accordance with claim 19, wherein the thickness of the non-ferrous panel is less than approximately 3 mm in the region where the magnet is located.

25. A magnetic holding system for a vehicle cabin, comprising:
   a non-ferrous panel having a front side exposed to the vehicle cabin and a rear side:
   a magnet located on the rear side of the non-ferrous panel;
   a ferrous element attachable to the underside of an object that is to be held on the non-ferrous surface;
   a covering element contacting and attached to the rear side of the non-ferrous panel and covering the magnet, wherein the strength of the magnet is sufficient to grip the ferrous object when it is placed on the front side of the panel in the region where the magnet is located; and
   a ferrous covering element attached to the rear of the magnet.

26. A magnetic holding system in accordance with claim 25, wherein the ferrous element comprises a magnet.

27. A magnetic holding system in accordance with claim 25, wherein the non-ferrous panel is included in one of the following: a dashboard, a seat back, a glove compartment and a center console.

28. A magnetic holding system in accordance with claim 25, wherein the magnet has a larger area than the ferrous element.

29. A magnetic holding system in accordance with claim 25, wherein the covering element is adapted to stiffen the non-ferrous panel in the region where the magnet is located.

30. A magnetic holding system in accordance with claim 25, wherein the thickness of the non-ferrous panel is less than approximately 3 mm in the region where the magnet is located.

* * * * *